May 23, 1967  C. R. CONRY  3,321,113
ADJUSTABLE CONTROLLED VOLUME LIQUID POURING DEVICE
Filed Dec. 7, 1965
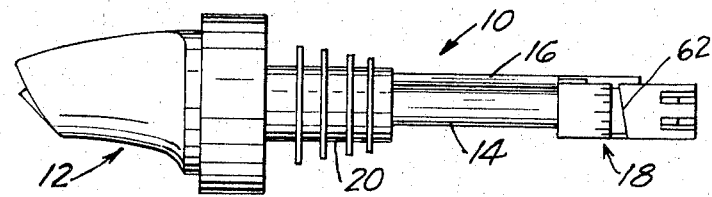
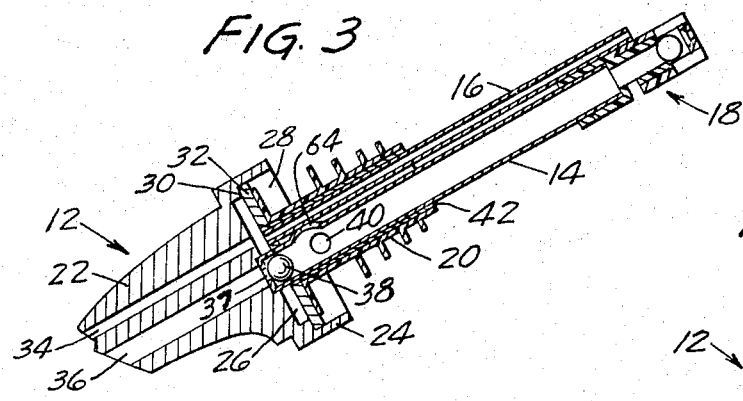
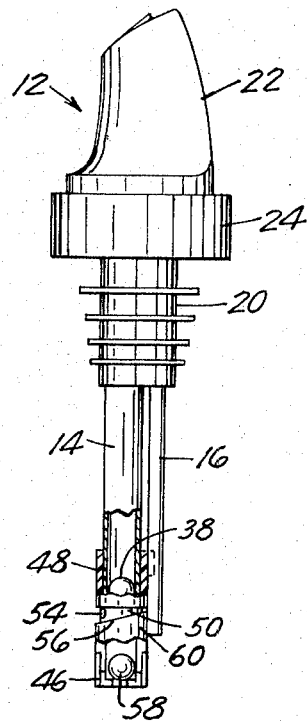
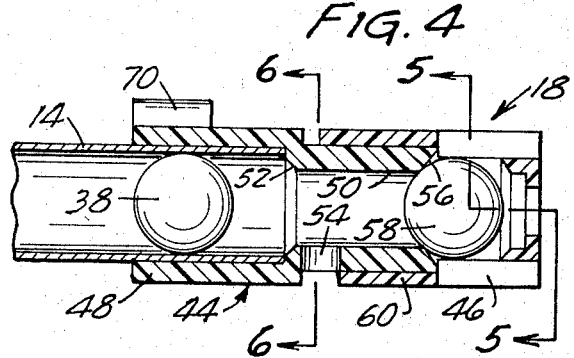
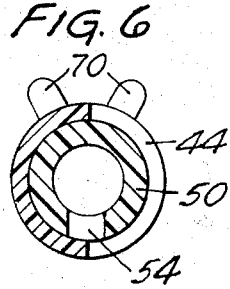
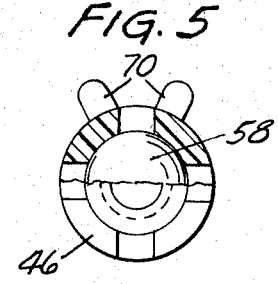
INVENTOR
CHARLES R. CONRY
BY
Donald M. Sell
ATTORNEY

United States Patent Office 3,321,113
Patented May 23, 1967

3,321,113
ADJUSTABLE CONTROLLED VOLUME LIQUID POURING DEVICE
Charles R. Conry, Joliet, Ill.
(468 Wabasha, St. Paul, Minn. 55101)
Filed Dec. 7, 1965, Ser. No. 512,601
7 Claims. (Cl. 222—477)

This invention relates to a pouring device for dispensing liquid from the mouth of a bottle. This invention provides a new and useful pouring device which dispenses a controlled volume of liquid in each pouring operation in an accurate and unobstrusive manner, even with successively rapid pouring operations, and which can be quickly adjusted to dispense a predetermined quantity of liquid in each pouring operation.

In the dispensing of liquids, particularly alcoholic beverages from bottles, it is customary to use pouring spouts mounted on the tops of the bottles to facilitate dispensing of liquid with minimum spillage. In general, these pouring spouts are free-flow pouring devices, i.e. the liquid continuing to flow therefrom so long as the bottle remains tilted. Customarily the liquid is dispensed into a measuring vessel of fixed volume, as for example: ½ oz., ¾ oz., 1 oz., 1½ oz., etc. and when the desired volume is reached in the measuring vessel, the bottle is tilted to its upright non-pouring position. The contents of the measuring vessel is usually thereafter emptied into a serving glass, or the like.

This procedure of pouring the liquid from the bottle to a measuring container and thence to the glass or other vessel in which the beverage is to be served or mixed is sometimes a tedious time-waster, as when a good many beverages are to be dispensed in a short period of time. Consequently, in the press of business, a bartender may resort to "sight-measuring" the amount of beverage directly into the glass or mixing container, thereby eliminating the intermediate step of pouring the beverage first into a measuring container. Because of variations in the size and shape of glasses and mixing containers, the amount and size of ice cubes and the like which may be present in the container, and other factors, sight-measuring is at best a haphazard measuring procedure.

To preserve the speed of pouring by sight-measure, many pouring devices have been made which themselves combine the pouring function and the measuring function so that as the pouring operation proceeds, a fixed volume of liquid will be dispensed with each pouring operation. However, many of these prior known measuring pourers are bulky and conspicuous and/or difficultly cleaned. Further, all of those prior known measuring pourers which have come to my attention are undependable and inaccurate when attempts are made to rapidly and successively dispense liquid therefrom in controlled quantities.

It is a principal object of this invention to provide a measuring pourer which will dispense approximately the same amount of liquid with each pouring operation, even though the pouring operations are successively rapidly repeated.

A further object of this invention is to provide a measuring pourer which may be readily and simply adjusted without any change of parts and without any external protuberances to dispense any predetermined amount of liquid within a fairly wide volume range, e.g. ½ ounce to 3 ounces.

A still further object of the invention is to provide measuring pourer, which in addition to its other advantages, preserves the appearance of a free-flow pourer and which is further so constructed so as to be readily disassembled for cleaning.

Yet another object of the invention is to provide a measuring pourer which can, at the option of the user, be used with no change in structure, but merely a change in position, as a free-flow pourer.

The foregoing, as well as other objects and advantages, which will become apparent as the description proceeds, are attained by this invention, a preferred embodiment of which is illustrated in the accompanying drawing wherein:

FIGURE 1 is a side elevational view of a measuring pourer made in accordance with this invention;

FIGURE 2 is a side elevational view of the pourer of FIGURE 1 in upright position with certain parts being broken away for clarity of detail;

FIGURE 3 is a cross-sectional view of a pourer in pouring position;

FIGURE 4 is a cross-sectional view of a lower end portion of the liquid dispensing tube of the pourer in cross-section and enlarged for clarity of detail;

FIGURE 5 is a cross-sectional view taken of substantially along the plane of section line 5—5 of FIGURE 4; and FIGURE 6 is a cross-sectional view taken substantially along the plane of section line 6—6 of FIGURE 4.

Referring first to FIGURE 1 of the drawing, the pouring device is illustrated in its entirety by the numeral 10. The pourer 10 comprises a pouring spout 12, a pouring tube 14, a vent tube 16, and a pouring control, or adjustable, means 18, attached to and forming an extension of the pouring tube 14. A stopper 20 is provided to sealingly mount the pourer 10 in the neck of a bottle (not shown) so that the vent and pouring tubes 16 and 14 respectively depend into the interior of the bottle while the pouring spout 12 disposed exteriorly of the mouth of the container.

In FIGURE 2 the pourer 10 is shown in somewhat more detail, the pouring spout or main body 12 of the pourer comprising a spout portion 22 and base portion 24. The base 24 comprises a downwardly depending peripheral annular flange. The recess in the spout 12 formed by the flange 24 is stepped inwardly to form an inner recess 26 and an outer recess 28 of somewhat larger size, an annular shoulder 30 forming a step between the smaller inner recess 26 and the larger outer recess 28. A plate 32 seals off the inner recess 26 from the outer recess 28 and converts recess 26 into a hollow chamber. The upper end of the vent tube 16 opens directly into the chamber 26. The pouring tube 14 extends through the chamber 26 into the spout portion 22. The spout portion 22 has vent passage 34 and pouring passage 36 therethrough which communicate with the chamber 26 at their lower ends. The vent passage 34 is axially offset from the vent tube 16 so that during the pouring operation liquid is not inadvertantly lost through vent passage 34, but rather is trapped in the chamber 26. The pouring tube 14 projects through the chamber 26 into the body portion of the pouring spout 22 and terminates in passage 36 of the spout so that it in effect forms an extension of the pouring passage 36.

At the juncture of the upper end of the pouring tube 14 to pouring passage 36, there is provided a ball valve seat 37 against which ball 38 sealingly seats when the pourer is tilted to pouring position as illustrated in FIGURE 3. Adjacent its upper end the pouring tube 14 is provided with one or more holes 40 for passage of liquid from the container into the pouring tube for dispensing through the spout 22 via the spout passage 36.

As will be noted particularly from FIGURE 3 the upper end of the vent to 16 terminates on a plane with the under surface of the circular plate 32. Also, a collar 42 depends from the central portion of the circular plate 32 and it is over this collar that the stopper 20 is slipped so that the pourer 10 can be seemingly mounted on the top of the bottle. Obviously, the size of the stopper 20 can be varied in accordance with the size of the mouth of the bottle over which the pourer is to be fitted. For ease of disassembly and cleaning, the vent and pouring tubes can be attached to collar 42 so that the plate 32, and the tubes can be removed from the spout as a unit. Of course, the pourer can be formed so that the components can be disassembled in other and different combinations.

Whereas in previously used measuring pourers the lower end of the pouring tube 14 is closed, except for a small liquid measuring control opening which prevents rapid emptying of liquid from the tube after each pouring operation, in accordance with the present invention, the pouring tube 14 is provided with a novel adjustable means 18 which permits unobstructed free-flow of liquid from the tube 14 after each pouring operation in addition to providing a simplified means for adjusting the amount of liquid to be dispensed in each pouring operation.

Turning to FIGURE 4 where the adjustable means 18 is illustrated in enlarged section, this adjustable means will be seen to comprise a two piece assembly of a stepped tube 44 having a ball cage 46 mounted thereon. The stepped tube 44 comprises a sleeve portion 48 which frictionally fits over the lower end of the pouring tube 14. This holds the adjustable means 18 in place and a tubular extension portion 50 inwardly stepped therefrom which serves as an extension of tube 14. Annular shoulder 52 abuts against the lower end of the pouring tube 14 and is only as large as is necessary to prevent the ball 38 from falling out of the pouring tube 14 when the pourer 10 is in an upright position. This tubular extension portion 50 of the stepped tube 44 has an opening 54 through the side wall thereof. This opening 54 is the liquid measuring control opening for the pourer. The lower end of the tubular extension 50 provides a ball seat 56 against which a second ball 58 loosely confined within the ball cage 46, is adapted to seat when the pourer is in pouring position as shown in FIGURE 3.

The ball cage 46 is provided with an upstanding annular flange, a sleeve 60 which frictionally and rotatably mounts cage 46 upon the tubular extension 50 of the sleeve 44. As will be observed from all of the drawing figures, the ball cage 46, except for the upstanding annular sleeve 60, is truly a cage in the sense that it is provided simply with bars and a bottom to hold the ball 58 within its confines, being otherwise quite open. The open work cage 46 is of a length somewhat greater than the diameter of the ball 58 so that when the pourer is in an upright position the ball rapidly falls from the seat 56 and to the bottom of the cage 46 leaving a free and open passage through the lower end of the pouring tube 14.

As will be observed particularly from FIGURES 1 and 4 the annular flange 60 of cage 46 is provided with a spiral top edge 62, the lower terminal of which begins at a point such that when in the proper position the entire opening 54 through the tube extension portion 50 of the sleeve 44 is exposed and the upper terminal of which is so disposed that upon rotating full circle the entire opening 54 will be covered by the flange wall, the size of the opening being varied at will by simply rotating the cage 46.

In the operation of the pourer 10, as the pourer is tilted, ball 38 begins to move from the lower end of the pouring tube 14 toward the ball seat 37 at the upper end thereof while ball 58 in the ball cage 46 immediately moves to seating position against the ballseat 56 upon the tubular extension 50 of the sleeve 44 of the adjustable means 18. In this way the rapidity of movement of ball 38 through pouring tube 14 is controlled by the size of the opening 54. Then, as the pourer is turned to an upright position, the liquid in the tube 14 which was prevented from flowing through the spout passage 36 by the ball 38 is now permitted to drain quite rapidly through the tube 14 because the bottom of this tube is quite open and free from flow inhibiting restrictions, the ball 58 falling to the bottom of the open ball cage 46 as the pouree is tilted upright. This feature enables the pourer 10 to maintain its accuracy even upon rapidly repeated pourings. There is no necessity after each pouring operation to wait a few moments until the liquid drains from the tube 14 as would be required with only a small opening such as 54 at the lower end of an otherwise closed end tube. This free drainage is made possible by the chamber formed between the ball 38 and the ball seat 56 in the tubular extension 50, through the sidewall of which the liquid dispensing control opening 54 is provided.

Not only does the provision of this ball cage assembly 46 enable the free drainage of unpoured liquid back through the pouring tube of 14 into the bottle to permit relatively rapid successive pouring operations, but the provision of the spiral edge 62 on the flange or sleeve 60 of the ball cage enables ready adjustability of the size of the opening 54 simply by rotating the ball cage. Thus, by the proper rotation the amount of liquid that is to be dispensed with each pouring operation can be easily controlled without any changing of parts.

Of course, the relation of the diameter of the ball 38 to the inside diameter of the tube 14 is quite important and these two diameters should be very close to being the same size. Apparently as the pouring tube is wetted by the passage of liquid thereinto through the liquid control opening 54, the capillary attraction of the liquid between the wall of the tube and the ball 38 creates a partial vacuum adjacent the lower end of the tube 14 upon seating of the ball 58 against the seat 56. Thus, the movement of the ball 38 along the tube 14 toward the upper end thereof is slowed down until sufficient liquid seeps in through the control opening 54 to release or lessen the vacuum whereupon the ball rolls toward the seat 37 to stop further flow of liquid through the pourer. The larger the opening 54, the more quickly the ball 38 moves toward the seat 37 and the less liquid dispensed for each tilting of the pourer. Conversely, the smaller the opening 54 is made by rotation of the ball cage 46 the less quickly the ball 38 moves toward the ball seat 37 and the more liquid dispensed for each tilting of the pourer.

In the adaptation of the pourer for dispensing alcoholic beverages an inside tube diameter of .255 inch and a ball diameter of .250 inch has been found to be about optimum. The length of the tube 14 is not critical since in general the tube length is sufficiently short, e.g. 2–3 inches, to enable emptying of the bottle, and long tube lengths are not particularly desired.

In order to convert the pourer to a free-flow pourer, adjacent the upper end of the pouring tube 14, this tube is provided with a detent 64 which provides the wall of the tube 14 with a depression opening into the inner surface of the wall of the tube 14. Thus, when the pourer is turned 180° from its normal pouring position as the bottle is tilted to dispense liquid therefrom, the ball 38 instead of seating against the ball seat 37 seats in the depression caused by the detent 64 and thereby permits free-flow of liquid through the pourer. This provides the pourer within a good deal of versatility in its use at all times and provides a ready means for completely emptying the container of liquid without removing the pourer 10 from the mouth of the bottle.

Further, the adjustable means 18, which exists simply as an appendage to the pouring tube 14 can be removed and replaced at will for cleaning and servicing of the pourer. The vent tube 16 remains entirely separate from the pouring tube 14 and to facilitate positioning and removal of the adjustable means 18, the sleeve 44 of this means is provided with guide tabs 70 which flank the vent tube 16 and prevent rotation of the sleeve 44 as the ball cage 46 is rotated. The resulting measuring pourer is a lightweight unit which combines the appearance and, if desired, the function of a free-flow pourer with the convenience of an adjustable measuring pourer.

While in the foregoing description, a preferred embodiment of the invention has been described to enable a proper understanding thereof, numerous modifications and changes will readily occur to those skilled in the art within the spirit of the invention. Thus, it is to be understood that the invention is not limited to the precise embodiment described, but embraces such equivalent modifications as fall within the scope of the appended claims.

I claim:

1. A measuring pourer for dispensing liquid from a bottle in a predetermined quantity for each pouring operation, said pourer comprising a pourer body having vent and pouring passages therethrough, vent and pouring tubes depending from said pourer and respectively communicating with said vent and pouring passages, a first ball slidably disposed in said pouring tube and a first valve seat at the upper end of said tube against which said first ball is adapted to seat to prevent further passage of liquid from said pourer while said pourer is in tilted pouring position, the lower end of said pouring tube being substantially open to permit unrestricted free-flow of unpoured liquid from said pouring tube upon returning the pourer to an upright non-pouring position, said pouring tube having at least one liquid entrance opening in the wall thereof said entrance opening being above the lower end portion of said pouring tube and means for controlling the amount of liquid to flow from said pourer during each pouring operation comprising a liquid control opening through the wall of said pouring tube adjacent the lower end thereof, stop means for said first ball above said control opening and a second valve seat at the lower end of said pouring tube below said liquid control opening, and a ball cage mounted on the lower end of said pouring tube in which a second ball is loosely confined and which maintains the said lower end of said tube substantially open when said pourer is in an upright non-pouring position, said second ball seating against said second valve seat as said pourer is tilted to pouring position to close off said lower end of said pouring tube and leave only said control opening in said tube in communication with the exterior of said first ball and the lower end of said pouring tube when said pourer is tilted to pouring position.

2. The combination of claim 1 wherein said ball cage includes an upstanding sleeve which rotatably fits over the lower end of said pouring tube, said sleeve having a spirally formed top edge and exposing all or any part of said control opening upon rotation.

3. The combination of claim 1 wherein said control opening is in a tubular extension depending below said pouring tube, said extension having an annular shoulder providing said stop means for said first ball, said cage having an upstanding annular sleeve rotatably fitting over said extension and selectively covering all or any part of said control opening upon rotation.

4. The combination of claim 2 wherein said pouring tube has a depression adjacent the upper end thereof in which said first ball is adapted to seat when said pourer is tilted to a pouring position at variance to its normal pouring position.

5. The combination of claim 2 wherein said pourer has a chamber formed therein into which said vent passage and said vent tube open in axially offset relation to one another.

6. The combination of claim 3 wherein said extension is provided with tabs flanking said vent tube to prevent rotation thereof as said cage is rotated.

7. An adjustably controllable measuring liquid pourer for dispensing liquid in a predetermined quantity for each pouring operation, said pourer comprising a pouring spout having a vent opening and a liquid dispensing opening therein, a liquid dispensing tube depending from said spout and communicating with said dispensing opening, a first valve seat at the upper end of said dispensing tube, a ball freely slidably disposed in said dispensing tube and adapted to close off communication between said dispensing opening and dispensing tube after the predetermined quantity of liquid has been dispensed when seated on said first valve seat, said dispensing tube having at least one opening in the side wall thereof for admitting liquid thereinto, said dispensing tube including adjustable means at the lower end thereof for adjustably controlling the amount of liquid to be dispensed in each pouring operation and permitting rapid drainage of liquid from said pouring tube after each pouring operation, said adjustable means including stop means adjacent the lower end of said dispensing tube for retaining said ball within said tube, a second valve seat spaced from said stop means and terminating in an open cage, said cage having a ball freely slidably disposed therein for sealingly seating against said second valve seat as said pourer is tilted to pouring position and for permitting substantially unrestricted liquid flow from said tube as said pourer is returned to a non-pouring position, said tubular portion having a liquid control opening therein between said stop means and said second valve seat and said adjustable means including means for controlling the size of said control opening.

References Cited by the Examiner

UNITED STATES PATENTS

| 252,519 | 1/1882 | Righter et al. | 222—500 X |
| 788,118 | 4/1905 | Perotti | 222—500 X |
| 1,654,810 | 1/1928 | Hillyard | 222—500 X |
| 2,368,540 | 1/1945 | Goodman | 222—477 |
| 2,968,423 | 1/1961 | Mahler et al. | 222—500 X |
| 3,233,797 | 2/1966 | Conry | 222—477 |

FOREIGN PATENTS 1,133,650  6/1962  Germany.

SAMUEL F. COLEMAN, *Primary Examiner.*